United States Patent [19]
Nevel et al.

[11] Patent Number: 5,541,734
[45] Date of Patent: * Jul. 30, 1996

[54] SYSTEM FOR ELECTRONICALLY GRADING YARN

[75] Inventors: Avishai Nevel; John B. Lawson, both of Providence; Kendall W. Gordon, Jr., North Kingstown, all of R.I.; David Bonneau, West Boylston, Mass.

[73] Assignee: Lawson-Hemphill, Inc., Central Falls, R.I.

[*] Notice: The portion of the term of this patent subsequent to Jun. 7, 2011, has been disclaimed.

[21] Appl. No.: 209,421

[22] Filed: Mar. 10, 1994

Related U.S. Application Data

[63] Continuation of Ser. No. 150,613, Nov. 10, 1993, abandoned, and a continuation-in-part of Ser. No. 950,830, Sep. 24, 1992, Pat. No. 5,319,578.

[51] Int. Cl.⁶ .................................................. G01B 11/10
[52] U.S. Cl. ..................... 356/385; 250/559.24; 356/429
[58] Field of Search ................................. 356/384, 385, 356/386, 387, 245, 429, 430, 431; 250/560, 561, 562, 559.24; 348/88, 91, 92, 93, 135

[56] References Cited

U.S. PATENT DOCUMENTS

| | | | |
|---|---|---|---|
| 4,887,155 | 12/1989 | Massen | 348/88 |
| 4,963,757 | 10/1990 | Liefde et al. | 356/429 |
| 5,319,578 | 6/1994 | Lawson et al. | 250/560 |

Primary Examiner—F. L. Evans
Attorney, Agent, or Firm—Brian M. Dingman

[57] ABSTRACT

A system for electronically comparing yarn lengths to assist in grading yarn appearance quality in which the yarn diameter at a number of locations along the total length of the yarn is determined, and representations of the diameters of the yarn are displayed to allow comparison of portions of the yarn.

16 Claims, 3 Drawing Sheets

SYSTEM FOR ELECTRONICALLY GRADING YARN

This is a continuation of application Ser. No. 08/150,613, filed Nov. 10, 1993, now abandoned, and a continuation in part of Ser. No. 07/950,830, filed Sep. 24, 1992, now U.S. Pat. No. 5,319,578, issued on Jun. 7, 1994.

FIELD OF INVENTION

This invention relates to a system for rapidly and electronically scanning and storing information over long lengths of yarn to display a large number of equal or progressively shorter selected lengths of the stored information side by side to grade yarn regularity or appearance.

BACKGROUND OF INVENTION

There are numerous quality control tests for yarns. One such test is for the yarn general appearance. This test is accomplished by winding the yarn onto a rectangular or trapezoidal-shaped black board to allow the side-by-side comparison of a number of relatively short lengths of yarn. This test has been standardized as ASTM D2255-64. The method describes winding the yarn on a rectangular or tapered board. The board covered with the wound yarn is then examined and a visual appraisal of appearance is made that takes into account slubs, hairiness, thick and thin places, broken ends, filaments and other novelty effects. Boards of standard yarns of known commercial quality may be wound and photographed for use as standards. Quantitative estimates of regularity may be made by counting the number of faulty places and expressing these as a percentage of the number of turns of yarn on the board.

This method has been used successfully for years for grading yarns. However, the method is relatively slow, inaccurate, labor intensive, and highly judgmental and thus expensive. The process requires an operator to wind the yarn on the board before the comparison can be made, and it also requires the assessment of a number (generally 5) of independent inspectors.

SUMMARY OF INVENTION

It is therefore an object of this invention to provide a system for electronically comparing yarn lengths to allow determination of the yarn quality.

It is a further object of this invention to provide such a system that is less expensive to accomplish than the manual system.

It is a further object of this invention to provide such a system that is quicker than the manual system.

It is a further object of this invention to provide such a system that allows the grading of greater quantity of yarn cones than is currently accomplished.

It is a further object of this invention to eliminate human judgment and replace it with actual counts and electronic gradings of yarn.

This invention results from the realization that the yarn comparison test for general yarn regularity may be accomplished electronically by electronically scanning a long length of yarn and displaying the long length of yarn as a number of side-by-side shorter lengths of yarn to create an electronic version of the manual inspection board currently in use, and representing different diameters with a parameter such as display line width, shades of grey, or colors to allow the visual comparison of diameters as done with the manual inspection board, and also allow electronic gradings and actual counts of faults.

This invention features a system for electronically comparing yarn lengths to assist in grading yarn appearance quality. In one embodiment the system includes means for determining the yarn diameter at a number of locations along a length of yarn, and means for displaying representations of the diameters of the yarn to allow comparison of portions of the yarn.

The yarn diameters may be determined with a light source for shining light on the yarn in a yarn measurement zone, and a light receiving means such as a CCD array which may be a linear array for receiving light passed by the yarn. In the embodiment in which the light receiving means is an array of small light receiving elements, the means for determining the yarn diameter may further include means for determining which array elements have not received light from the light source. The means for determining the yarn diameter may further include means for determining the farthest-spaced pair of light receiving elements that have not received light as indicative of the yarn diameter.

The system may further include means for dividing the diameters into a plurality of groups, each group representing a portion of the length of the yarn. In that case, the groups of diameters may be adjacent so that the portion of the yarn measured is continuous. The means for displaying the representations may then include means for displaying the representations of the groups side-by-side to facilitate comparison. The groups may represent yarn portions of the same or different lengths depending on whether a rectangular or trapezoidal (tapered) display is desired.

The means for displaying the representations of the diameters may include means for assigning different representation parameters to different yarn diameters. The representation parameters may include different grey values for a monochrome display, or different colors for a color display. The means for displaying the representations may include a video display.

The system may further include means for establishing a minimum or maximum yarn width threshold, and a length threshold, to define a yarn event (a yarn portion of more or less than a certain diameter continuously for at least a certain length). Events may be displayed as short line segments, and may also be counted and tabulated. The remainder of the length of yarn may not be displayed to create a display of spaced line segments which facilitates recognition of event regularity.

In a more specific embodiment, this invention features a system for electronically comparing yarn lengths to assist in grading yarn quality which includes a light source for providing light to a yarn measurement zone, means for moving yarn through the measurement zone, and a linear array of light-sensing elements for receiving light passed by the yarn. There are means for determining the yarn diameter at a number of closely-spaced locations along a length of yarn, and means for dividing the diameters into a plurality of groups each representing a portion of a length of yarn. There are means for assigning different representation parameters to different yarn diameters, and means for displaying the representation parameters of the yarn portions side-by-side on a video display to allow comparison of the yarn portions.

BRIEF DESCRIPTION OF THE DRAWINGS

Other objects, features and advantages will occur to those skilled in the art from the following description of a preferred embodiment and the accompanying drawings in which.

DESCRIPTION OF THE PREFERRED EMBODIMENT

This invention may be accomplished in a system for electronically comparing yarn portions to assist in determining yarn quality. The system preferably determines the yarn diameter at a large number of closely spaced locations along a length of yarn. This may be accomplished with an electronic sensor which may include a linear CCD array and a light source for shining a light into a measurement zone through which the yarn is moved. The CCD captures a shadow image of the yarn. The system then determines the yarn diameter. The diameter in one embodiment is based on the farthest-spaced pair of the CCD pixels that do not receive light so that the yarn diameter measurement includes measurement of hairs, slubs and other thick spots in the yarn. Alternatively, diameter can be measured in more traditional manners, for example by summing the closed or blocked pixels of the CCD array.

These yarn diameter measurements are then divided into a number of groups of measurements representing adjacent, shorter lengths of yarn. Representations of the measured diameters for each of the sub-lengths are then displayed side-by-side to mimic the manual inspection or taper board. The representation may be a line whose width is directly related to the measured diameter so that the appearance is similar to that of a black yarn, in which case the yarn diameter may be represented by the width of the black line. Alternatively, the line representations could be of constant width, for example one or more raster scan lines of the CRT display, and the width may be represented using grey scale or color. In one embodiment, the string of diameter data may be converted to an 8-bit image, and each pixel may have a value of between 0 and 255 to accomplish a grey-scale representation of width. Alternatively, different diameter ranges may be represented by different shades of grey or colors as desired to accomplish a system that facilitates the determination of yarn quality by the operator.

In another alternative embodiment, the measurement system can determine the locations of yarn events, which are pre-defined by the operator. An example of an event would be at least a specified yarn width continuously for at least a specified length, for measuring balloons in entangled yarns. Each event could then be represented in the display by a short line segment of fixed length, or with a length related to the event length. The remaining portions of the yarn would not be displayed, resulting in a series of spaced line segments on the display screen. Repetitive events would be discernible by patterns in the display, just as they would be in a traditional taper board.

Figure 1:
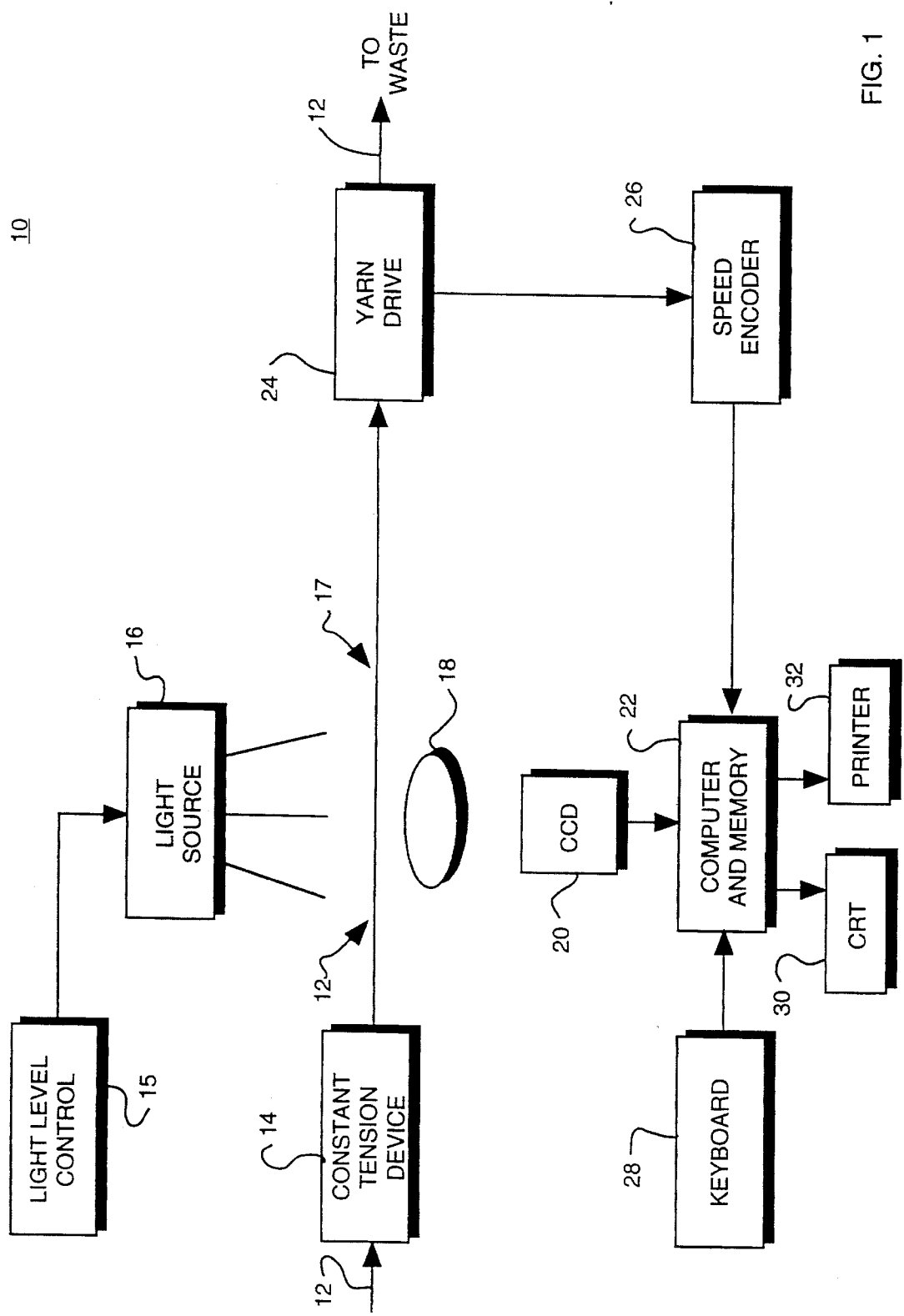
FIG. 1 is a schematic diagram of yarn profile imaging device useful in the system of this invention.

There is shown in FIG. 1 yarn profile measurement system 10 useful in the system of this invention. Yarn measurement system 10 accomplishes the yarn diameter measurements and display of the representations of the diameters to assist the operator in determining yarn quality. Analyzer 10 is used to make width measurements of yarn 12 moved through imaging area 17 by yarn drive 24. Yarn 12 may pass through constant tension device 14 before entering imaging area 17 so that it may be held under a constant, reproducible tension while being imaged. Precision control of the yarn speed is accomplished with yarn drive 24 so that the yarn may be passed through imaging area 17 at a constant, reproducible speed. This speed and tension control provides the ability of device 10 to develop useful, accurate, quantitative data concerning each unit of yarn under test.

Light source 16 provides light in imaging area 17 that is focussed by lens 18 onto linear CCD array 20 to create an image sharp enough for the desired purposes. Light level control 15 allows operator control of the light output level of light source 16. Preferably, light source 16 is an incandescent lamp, and control 15 is regulated DC lamp power supply with variable output to provide a steady light source without 60 Hz flicker that has a variable light-level output so that the operator may regulate the amount of light received by the CCD pixels that is considered to be a blocked pixel. The amount of light sensed by each pixel of array 20 is provided as a related analog voltage at the output of array 20. This level can be compared to an adjustable, operator established threshold level in computer 22 so that the device reports a blocked or unlighted pixel only when the selected percent of the maximum possible incident light actually received is below the selected threshold level. This threshold and light level flexibility allows the operator to either emphasize or filter out specific details of a yarn such as hairiness.

Speed encoder 26 is preferably used to measure the lengths of yarn transported by drive mechanism 24. The output of encoder 26 is then translated into yarn lengths and yarn speed by computer 22. Keyboard 28 is used by the operator to enter commands for operation for computer 22 in a known fashion. The output of the device may then be applied to either CRT 30 and/or printer 32 as desired.

Figure 2:
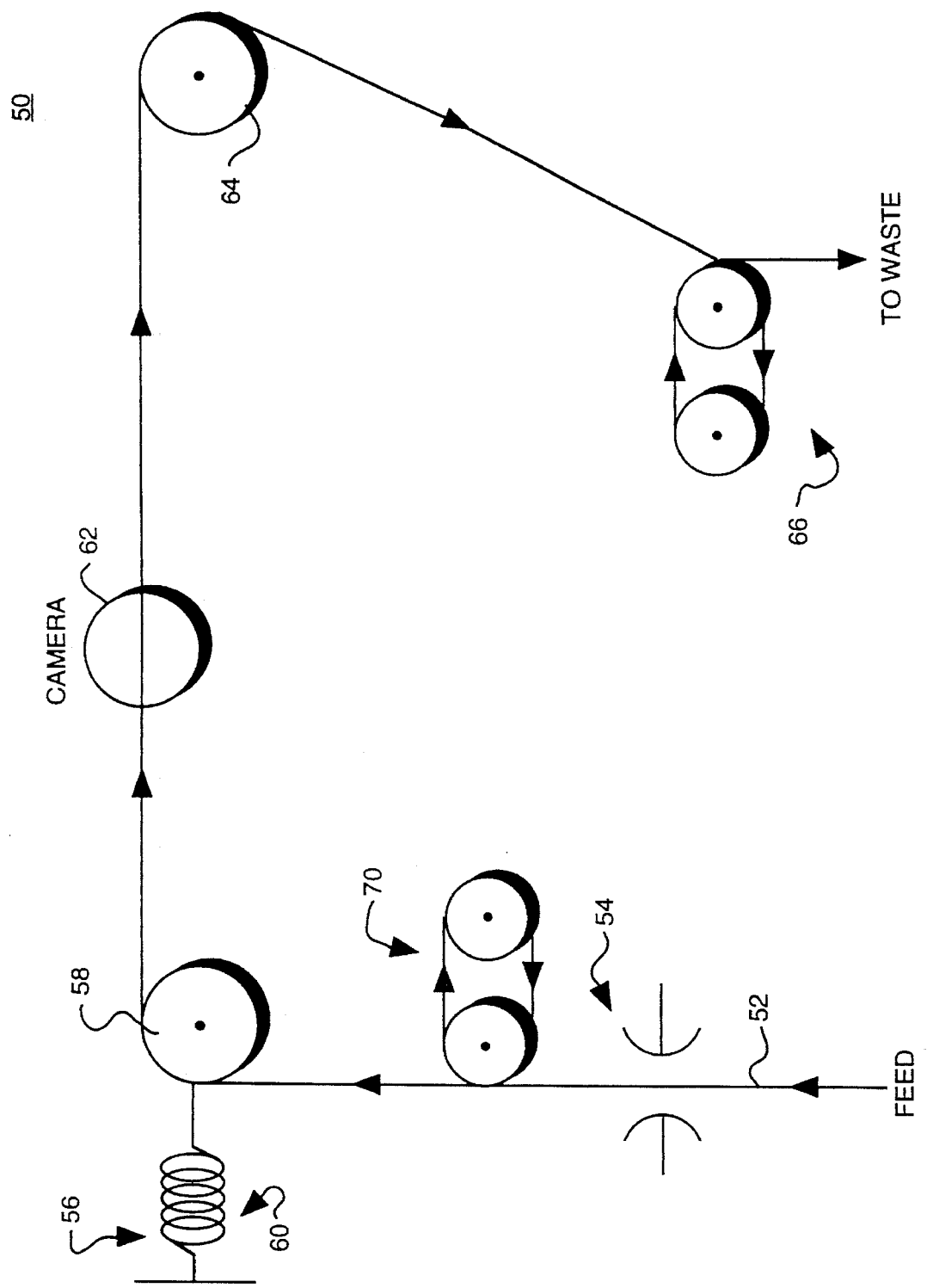
FIG. 2 is a highly schematic view of a preferred embodiment of the device of FIG. 1.

Embodiment 50 of the yarn diameter measurement system useful in this invention is shown schematically in FIG. 2. Yarn 52 is passed through pretension device 54, around a first set of feed rolls 70, and then through constant tension device 56 schematically depicted as roller 58 and adjustable tension spring 60. Device 56 preferably allows the operator to select the tension applied to yarn 52 from ½ to 750 grams. Camera 62 images the yarn and provides the image to the computer. In a preferred embodiment, the linear CCD array described above is employed and operated at about 3,200 scans per second with the yarn diameters measured and stored for selected lengths of yarn with the yarn running at selected speeds. This is accomplished with a clock running at approximately 15 MHz. The yarn is then directed by roller 64 to driven roll pairs 66 around which yarn 52 is wound one or more times to pull the yarn through camera 62. The embodiments of FIGS. 1 and 2 are described in more detail in copending applications 07/950,830, filed Sep. 24, 1992, and 08/107,968, filed Aug. 17, 1993, both incorporated herein by reference.

Figure 3:
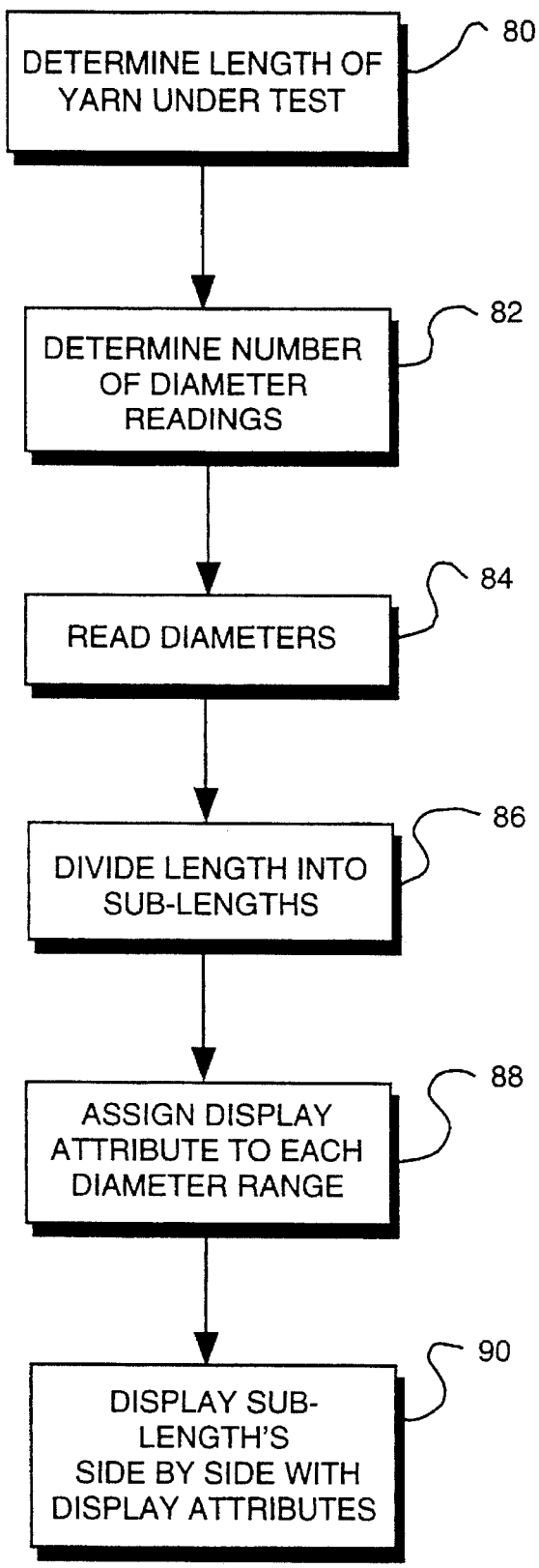
FIG. 3 is a block diagram of the operation of the device of FIG. 1 according to a preferred embodiment of this invention.

A flow chart for operation of a preferred embodiment of the system of this invention, using the equipment shown in FIGS. 1 and 2, is shown in FIG. 3. The system first determines the length of yarn under test, preferably under operator control. Then the system determines the number of diameter readings to take for that length. The maximum number would be set either by the amount of available memory or the yarn speed and length under test versus the measurement device clock speed, which would determine the number of measurements taken per unit length. For a standard CRT display with 640 pixels on each of 480 raster scan lines the system could handle up to 307,200 scans in a situation in which one screen pixel would represent one diameter scan. In that case, the measured diameters could be converted into an 8-bit image, and each pixel could be assigned a value between 0 and 255 to represent the diameters with a grey scale image.

The system reads the diameters, step 84, by moving the yarn through the imaging area as shown in FIGS. 1 and 2. In a preferred embodiment, the diameter is calculated based on the two farthest-spaced pixels of the CCD array which are considered to be blocked by the yarn, regardless of any intervening unblocked pixels, so that, for example, hairiness is measured as contributing to the overall diameter of the yarn. By adjusting the amount of received light which is considered to represent a blocked pixel, the operator may in effect filter out or emphasize such hairiness or other less dense yarn areas as desired.

The system then divides the measured length of yarn into a number of sub-lengths for display, step 86. For the case described above in which there are 640 measurements on each of 480 raster scan lines, the total of 307,200 scans would be divided into 480 adjacent groups of 640 scans each. The system then assigns display parameters to each diameter or diameter range, step 88. This may be accomplished as described above for a grey scale image. Alternatively, fewer shades of grey, or colors, may be used. In any case, each diameter or each diameter range as established by the operator is assigned a different representation parameter such as color or shade of grey. Everyone, or some of, the sub-lengths are then displayed side-by-side, with those display parameters, step 90, to accomplish an electronic version of the standard inspection board or taper board used for determining the general regularity of the yarn as set forth in the ASTM standard.

To represent the taper board, in step 86 where the measured length is divided into sub-lengths, the sub-lengths would be decreasingly shorter to accomplish a display that was trapezoidal in shape. Other shapes could obviously be chosen.

In another alternative embodiment, the yarn diameter could be represented by the width of the display line representing the yarn. In that case, each length of yarn would be allotted more than one raster scan line to allow for variations in width to be displayed.

The system could also be enabled to store and display next to the image of the measured yarn images of standard yarns in a similar manner to the standard yarn image photograph used in the ASTM standard. This would allow the operator in a single screen to compare the electronically-imaged yarn length to standard yarns to determine the yarn grade.

Some of the system variables that may be established by the operator for the system of this invention include the yarn speed through the measurement zone, the number of diameter measurements or scans per millimeter, the size of the image, the image aspect ratio, the light source intensity relative to threshold, the display size, and the yarn diameter ranges to be assigned to different parameter values.

A display parameter could be assigned based on the length of an event as well as the diameter. For example, diameters of a certain size which are present for at least a certain length could be assigned one color or grey scale value so that the system would in effect ignore thick or thin areas that were shorter than a decided length to allow only certain events to be displayed. As described above, to facilitate operator recognition of a regularly-spaced fault, events could be displayed as short line segments, with no display for the yarn portions between events. This creates a series of horizontal line segments on the CRT, and regular events are immediately recognized by patterns in the line segment display. The lengths of these line segments are preferably user-definable. The line segments will typically be short segments of constant length, or segments whose length is directly related to the actual length of the event. Events such as these could in any case be automatically counted and classified based on the representation parameter. Multiple events could be predefined by the operator, displayed in different fashions to allow the operator to grade the yarn, and automatically counted and tabulated by the system. The system can be programmed to count events such as numbers of a certain grey or color scale values as they occur in a given screen (board) display to produce quantitative measurements of yarn appearance.

Therefore, although specific features of the invention are shown in some drawings and not others, this is for convenience only as some feature may be combined with any or all of the other features in accordance with the invention.

And, other embodiments will occur to those skilled in the art and are within the following claims:

What is claimed is:

1. A system for electronically comparing yarn lengths to assist in grading yarn quality, comprising:

means for determining the yarn diameter at a number of locations along a length of yarn; and means for displaying representations of the diameters of the yarn to allow comparison of yarn portions.

2. The system of claim 1 in which said means for determining the yarn diameter includes a light source for shining light on the yarn in a yarn measurement zone and light receiving means for receiving light passed by the yarn.

3. The system of claim 2 in which the light receiving means includes an array of small light receiving elements, and said means for determining the yarn diameter further includes means for determining which array elements have not received light from the light source.

4. The system of claim 3 in which said means for determining the yarn diameter further includes means for determining the farthest-spaced pair of light receiving elements that have not received light as indicative of the yarn diameter.

5. The system of claim 1 further including means for dividing the diameters into a plurality of groups, each group representing a portion of the length of yarn.

6. The system of claim 5 in which the groups of diameters are adjacent so that the portion of yarn measured is continuous.

7. The system of claim 1 in which said means for displaying includes means for assigning different representation parameters to different yarn diameters.

8. The system of claim 7 in which said representation parameters include different grey values for a monochrome display.

9. The system of claim 7 in which representation parameters include different colors for a color display.

10. The system of claim 1 in which said means for displaying representations includes a video display.

11. The system of claim 5 in which said means for displaying representations includes means for displaying the representations of the groups side-by-side to facilitate comparison of the groups.

12. The system of claim 5 in which the groups represent yarn portions of different lengths.

13. The system of claim 1 further including means for establishing a width threshold and length threshold to define a yarn event.

14. The system of claim 13 in which the displayed representation for an event is a short line segment.

15. The system of claim 14 in which there is no display for non-events in the length of yarn to create a display of spaced line segments that facilitates recognition of event regularity.

16. A system for electronically comparing yarn lengths to assist in grading yarn quality, comprising:

a light source for providing light to a yarn measurement zone;

means for moving yarn through the measurement zone;

a linear array of light-sensing elements for receiving light passed by the yarn;

means for determining the yarn diameter at a number of closely-spaced locations along a length of yarn;

means for dividing the diameters into a plurality of groups each representing a portion of the length of yarn;

means for assigning different representation parameters to different yarn diameters; and means for displaying the representation parameters of the yarn portions side-by-side on a video display to allow comparison of the yarn portions.

* * * * *